US012493839B2

(12) United States Patent
Hong et al.

(10) Patent No.: US 12,493,839 B2
(45) Date of Patent: Dec. 9, 2025

(54) SYSTEM AND METHOD FOR SELECTING PROCESS KEY FACTOR IN COMMERCIAL CHEMICAL PROCESS

(71) Applicant: SK GAS CO., LTD., Seongnam-si (KR)

(72) Inventors: Ung Gi Hong, Seongnam-si (KR); Sung Joo Yeo, Seongnam-si (KR); Seung Hwan Kong, Seongnam-si (KR); Min Ho Kim, Seongnam-si (KR); Hae Bin Shin, Seongnam-si (KR); Hee Dong Choi, Seongnam-si (KR); Young Gook Kye, Seongnam-si (KR)

(73) Assignee: SK GAS CO., LTD., Seongnam-si (KR)

( * ) Notice: Subject to any disclaimer, the term of this patent is extended or adjusted under 35 U.S.C. 154(b) by 78 days.

(21) Appl. No.: 18/275,676

(22) PCT Filed: Apr. 27, 2022

(86) PCT No.: PCT/KR2022/005973
§ 371 (c)(1),
(2) Date: Aug. 3, 2023

(87) PCT Pub. No.: WO2022/231282
PCT Pub. Date: Nov. 3, 2022

(65) Prior Publication Data
US 2024/0104464 A1    Mar. 28, 2024

(30) Foreign Application Priority Data
Apr. 28, 2021    (KR) .................. 10-2021-0055072

(51) Int. Cl.
*G06Q 10/06*    (2023.01)
*G06Q 10/0631*    (2023.01)
(Continued)

(52) U.S. Cl.
CPC .. *G06Q 10/06316* (2013.01); *G06Q 10/06393* (2013.01); *G06Q 50/04* (2013.01)

(58) Field of Classification Search
CPC ........................................ G06Q 10/02–90/00
See application file for complete search history.

(56) References Cited

U.S. PATENT DOCUMENTS 7,424,395 B2 *  9/2008  Emigholz .......... G05B 23/0254
                                                                702/182
11,782,401 B2 * 10/2023  Keenan .................... G06N 3/08
                                                                 706/23
(Continued)

FOREIGN PATENT DOCUMENTS

JP    2016-189166 A    11/2016
KR    10-0500802 B1     7/2005
(Continued)

OTHER PUBLICATIONS

International Search Report for PCT/KR2022/005973 mailed Aug. 12, 2022 from Korean Intellectual Property Office.

*Primary Examiner* — Arif Ullah
(74) *Attorney, Agent, or Firm* — Paratus Law Group, PLLC (57) ABSTRACT

A system selecting a process key factor in a commercial chemical process, includes: a data extraction unit that extracts tag data in units of a set period; an outlier discrimination unit that discriminates and aggregates outliers by tag by using an outlier extraction reference master; an outlier processing unit that generates an input mart draft excluding the outliers; a derived variable generation unit that generates derived variables for each tag, and generates an advanced input mart having the derived variable added thereto; a yield calculation unit that backs up the result of calculation of a yield by realizing a target value via exclusion and correction of the outliers; and a key factor extraction unit that extracts (Continued)

a yield key factor by calculating importance of each tag, and backs up importance data for each tag.

9 Claims, 4 Drawing Sheets

(51) Int. Cl.
*G06Q 10/0639* (2023.01)
*G06Q 50/04* (2012.01)

(56) References Cited

U.S. PATENT DOCUMENTS

| | | | |
|---|---|---|---|
| 12,140,914 B2 * | 11/2024 | Schulz | G05B 13/04 |
| 2009/0069944 A1 | 3/2009 | Billig et al. | |
| 2011/0202177 A1 | 8/2011 | Elizarov et al. | |
| 2021/0358571 A1 * | 11/2021 | Islam | G16H 50/20 |
| 2022/0328128 A1 * | 10/2022 | Kok | G06N 20/00 |

FOREIGN PATENT DOCUMENTS

| | | |
|---|---|---|
| KR | 10-1508641 B1 | 4/2015 |
| KR | 10-2018-0131246 A | 12/2018 |
| KR | 10-2019-0098484 A | 8/2019 |
| KR | 10-2019-0135445 A | 12/2019 |

* cited by examiner

SYSTEM AND METHOD FOR SELECTING PROCESS KEY FACTOR IN COMMERCIAL CHEMICAL PROCESS

CROSS-REFERENCE TO PRIOR APPLICATIONS

This application is a National Stage Patent Application of PCT International Application No. PCT/KR2022/005973 (filed on Apr. 27, 2022), which claims priority to Korean Patent Application No. 10-2021-0055072 (filed on Apr. 28, 2021), which are all hereby incorporated by reference in their entirety.

BACKGROUND

The present disclosure relates to process change monitoring, and more particularly, to a system and method for selecting a process key factor in a commercial chemical process, which enable the optimization of an operation condition by efficiently selecting a key factor affecting a process change according to a process operation condition.

In performing a series of processes comprised of many steps, integrity assurance and reliability are very important for organically linking every process. To achieve such integrity, the processes require the development of an efficient process management system that enables to detect any glitch in each process from input values of main facilities and diagnose the cause.

Generally, most of past data generated in an industrial process often has few variables and a linear data structure, which makes it possible to obtain enough prediction/classification results by an existing algorithm alone.

However, because of the development of ICT and sensor technology, data with several hundred or thousand variables have begun to be generated in manufacturing processes or in the fields of genetic engineering.

In particular, in contemporary industrial processes such as chemical and manufacturing processes and power plants, the scale of data is getting bigger and more complex over time, since various efforts are being made to meet safety, health, and environment-related regulations and maximize profits.

Thus, it is very critical to select and manage data that has a large effect on the creation of profits from among an enormous amount of complex data.

For example, a process operation condition in a commercial chemical process has short-term and long-term effects on catalytic activity, and the catalytic activity is directly linked to production yield. Thus, it is very important to predict catalytic activity from a short-term and long-term perspective.

From a short-term perspective, it is necessary to increase production yield by detecting a change in catalytic activity according to a process operation condition and improving catalytic activity through the optimization of the operation condition.

From a long-term perspective, in a commercial chemical process using a catalyst, the catalyst becomes deactivated with progression of the process operation, thus resulting in a decrease in activity, which requires replacement after a certain period of time. Such a catalyst replacement costs a lot of time and money, and therefore it is important to predict future catalytic activity and determine the catalyst lifetime and when to replace it.

Accordingly, it is necessary to develop a new technology that enables the optimization of an operation condition by efficiently selecting a key factor affecting a change in catalytic activity according to a process operation condition.

(Patent Document 1) Korean Laid-Open Patent No. 10-2018-0131246
(Patent Document 2) Korean Laid-Open Patent No. 10-1508641
(Patent Document 3) Korean Laid-Open Patent No. 10-2019-0098484.

SUMMARY

The present disclosure has been made in an effort to solve the problems of process change monitoring technologies in the conventional art, and an aspect of the present disclosure is to provide a system and method for selecting a process key factor affecting catalytic activity in a commercial chemical process, which enable the optimization of an operation condition by efficiently selecting a key factor affecting a change in catalytic activity according to a process operation condition.

An aspect of the present disclosure is to provide a system and method for selecting a process key factor affecting catalytic activity in a commercial chemical process, which help efficiently manage the time and cost of product production and catalyst replacement by allowing to determine a product sales plan and when to replace the catalyst through accurate catalytic activity prediction.

An aspect of the present disclosure is to provide a system and method for selecting a process key factor affecting catalytic activity in a commercial chemical process, which can increase product yield by detecting a change in catalytic activity according to a process operation condition and improving catalytic activity through the optimization of the operation condition.

An aspect of the present disclosure is to provide a system and method for selecting a process key factor affecting catalytic activity in a commercial chemical process, which help increase the long-term stability of the commercial chemical process by quantitatively identifying an aggregation curve for energy of metal oxides, an alloy crystallization, and so on.

An aspect of the present disclosure is to provide a system and method for selecting a process key factor affecting catalytic activity in a commercial chemical process, which allows for real-time analysis of MSI changes caused by energy inflow and outflow from the point of view of the catalyst by rebuilding a DB using big data and constructing a prediction model, in a commercial plant that uses a fixed bed catalytic reaction.

The aspects of the present disclosure are not limited to the foregoing, and other aspects not mentioned herein will be able to be clearly understood by those skilled in the art from the following description.

To accomplish the above aspects, a system for selecting a process key factor affecting catalytic activity in a commercial chemical process according to the present disclosure includes: a data extraction unit that extracts tag data in units of a set period; an outlier discrimination unit that discriminates and aggregates outliers by tag by using an outlier extraction reference master; an outlier processing unit that generates an input mart draft excluding the outliers; a derived variable generation unit that generates derived variables for each tag, and generates an advanced input mart having the derived variable added thereto; a yield calculation unit that backs up the result of calculation of a yield by realizing a target value via exclusion and correction of the outliers; and a key factor extraction unit that extracts a yield key factor by calculating importance of each tag, and backs up importance data for each tag.

Here, data to be inputted into the data extraction unit includes: plant process operation data in an olefin production process, including data for each section, each unit, and each tag; laboratory data including LIMS (Laboratory Information Management System) data, plant event master data including a shut-down history, long integers/short integers, etc.; and past yield data including conversion rates and selectivity.

Furthermore, the plant process operation data in the olefin production process is sensor data including temperature, pressure, flow, and composition data, and past data accumulated continuously over a unit period of time.

Furthermore, the outlier extraction reference master which is used for the outlier discrimination unit to discriminate and aggregate outliers for each tag continuously updates reference values for extracting outliers over time in consistency with the concept of a machine learning-based system.

To accomplish other aspects, a method for selecting a process key factor affecting catalytic activity in a commercial chemical process according to the present disclosure includes: a data extraction step of extracting tag data in units of a set period; an outlier discrimination step of discriminating and aggregating outliers by tag by using an outlier extraction reference master; an outlier processing step of generating an input mart draft excluding the outliers; a derived variable generation step of generating derived variables for each tag and generating an advanced input mart having the derived variable added thereto; a yield calculation step of backing up the result of calculation of a yield by realizing a target value via exclusion and correction of the outliers; and a key factor extraction step of extracting a yield key factor by calculating importance of each tag, and backs up importance data for each tag.

Here, data used in the data extraction step includes: plant process operation data in an olefin production process, including data for each section, each unit, and each tag; laboratory data including LIMS (Laboratory Information Management System) data, plant event master data including a shut-down history, long integers/short integers, etc.; and past yield data including conversion rates and selectivity.

Furthermore, the plant process operation data in the olefin production process is sensor data including temperature, pressure, flow, and composition data, and past data accumulated continuously over a unit period of time.

Furthermore, process, laboratory, and plant data is integrated/utilized for accurate yield prediction, and the data is converted in units of minutes or hours for analysis and stored in a data warehouse.

Furthermore, the outlier extraction reference master which is used in the outlier discrimination step to discriminate and aggregate outliers for each tag continuously updates reference values for extracting outliers over time in consistency with the concept of a machine learning-based system.

Furthermore, in the outlier discrimination step, a technique of using a statically based sigma and a technique of filtering outliers using a quantile/quartile value are applied in order to select and exclude or correct outliers and then use only filtered values as input.

Furthermore, in the outlier processing step, an input mart is an input data frame that is to be inputted to train a prediction model.

Furthermore, in the derived variable generation step, outliers are not used directly after being filtered from raw data, but derived variables are generated based on time differences and statistics to avoid information loss from data.

Furthermore, the yield key factor extracted by calculating importance of each tag in the key factor extraction step is applied to a constructed forecasting model (ML/DL-based yield forecasting) and used to predict catalytic activity.

The above-described system and method for selecting a process key factor affecting catalytic activity in a commercial chemical process according to the present disclosure have the following advantageous effects.

First, they enable the optimization of an operation condition by efficiently selecting a key factor affecting a process change according to a process operation condition.

Second, it is possible to efficiently manage the time and cost of product production and catalyst replacement by allowing to determine a product sales plan and when to replace the catalyst through accurate catalytic activity prediction.

Third, it is possible to increase product yield by detecting a change in catalytic activity according to a process operation condition and improving catalytic activity through the optimization of the operation condition.

Fourth, it is possible to increase the long-term stability of the commercial chemical process by quantitatively identifying an aggregation curve for energy of metal oxides, an alloy crystallization, and so on.

Fifth, it is possible to perform real-time analysis of MSI changes caused by energy inflow and outflow from the point of view of the catalyst by rebuilding a DB using big data and constructing a prediction model, in a commercial plant that uses a fixed bed catalytic reaction.

BRIEF DESCRIPTION OF THE DRAWINGS

FIGS. 3A and 3B are output screen configuration diagrams showing an example of catalytic activity prediction results that reflect key factors in a commercial chemical process according to the present disclosure.

DETAILED DESCRIPTION

A system for selecting a process key factor affecting catalytic activity in a commercial chemical process according to the present disclosure includes: a data extraction unit that extracts tag data in units of a set period; an outlier discrimination unit that discriminates and aggregates outliers by tag by using an outlier extraction reference master; an outlier processing unit that generates an input mart draft excluding the outliers; a derived variable generation unit that generates derived variables for each tag, and generates an advanced input mart having the derived variable added thereto; a yield calculation unit that backs up the result of calculation of a yield by realizing a target value via exclusion and correction of the outliers; and a key factor extraction unit that extracts a yield key factor by calculating importance of each tag, and backs up importance data for each tag.

Hereinafter, a system and method for selecting a process key factor affecting catalytic activity in a commercial chemical process according to exemplary embodiments of the present disclosure will be described below in detail.

The features and advantages of the system and method for selecting a process key factor affecting catalytic activity in a commercial chemical process according to the present disclosure will be apparent from the following descriptions of the embodiments.

Figure 1:
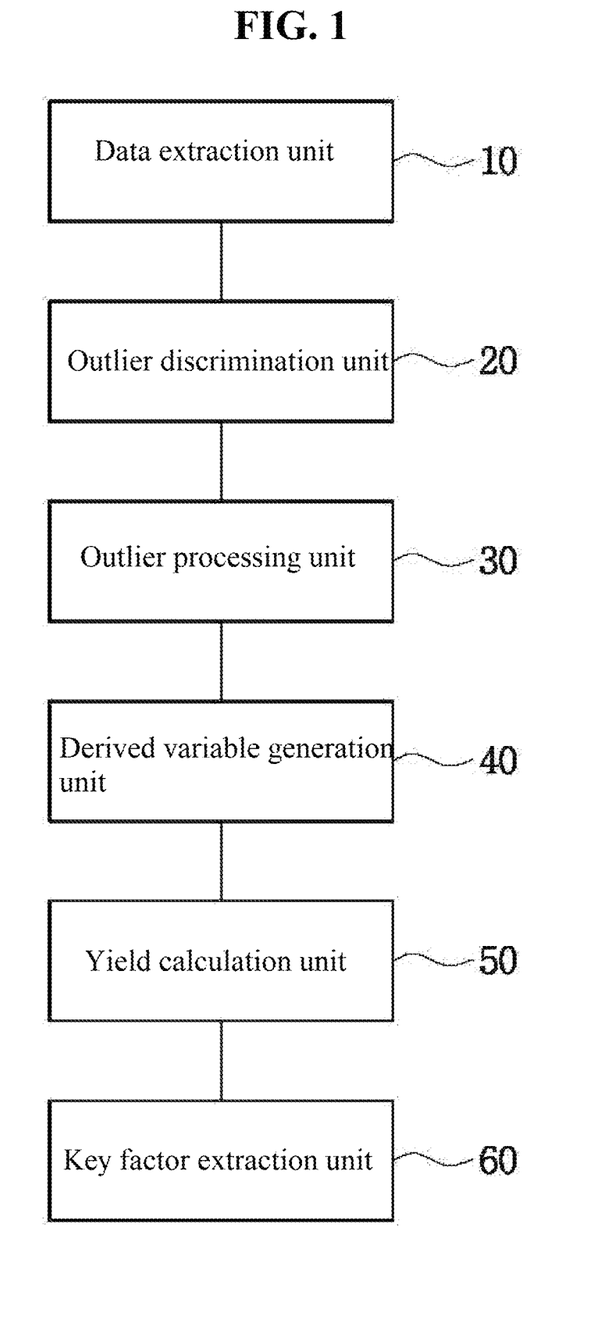
FIG. 1 is a block diagram of a system for selecting a process key factor in a commercial chemical process according to the present disclosure.

FIG. 1 is a block diagram of a system for selecting a process key factor in a commercial chemical process according to the present disclosure.

A system and method for selecting a process key factor affecting catalytic activity in a commercial chemical process according to the present disclosure enable the optimization of an operation condition by efficiently selecting a key factor affecting a process change according to a process operation condition.

To this end, the present disclosure may include a component that extracts tag data in units of minutes/hours by using plant process operation data in an olefin production process, laboratory data, a plant event master, and past yield data.

The present disclosure may include a component that discriminates and aggregates outliers by tag by using an outlier extraction reference master and generates an input mart draft excluding the outliers.

The present disclosure may include a component that generates derived variables for each tag, generates an advanced input mart having the derived variable added thereto, and backs up the result of calculation of a yield by realizing a target value (yield) via exclusion and correction of the outliers.

The present disclosure may include a component that extracts a yield key factor by calculating importance of each tag and backs up importance data for each tag (variable).

The following description has been given of a "factor related to catalytic activity" as an example of a "key factor affecting a process change", but is not limited thereto.

Such a system and method for selecting a process key factor affecting catalytic activity in a commercial chemical process according to the present disclosure help efficiently manage the time and cost of product production and catalyst replacement by allowing to determine a product sales plan and when to replace the catalyst through accurate catalytic activity prediction, by selecting a key factor affecting catalytic activity in a commercial chemical process.

As an example of application of a system and method for selecting a process key factor affecting catalytic activity in a commercial chemical process according to the present disclosure, the long-term stability of the commercial chemical process can be increased by quantitatively identifying an aggregation curve for energy of metal oxides, an alloy crystallization, and so on.

Moreover, MSI changes caused by energy inflow and outflow from the point of view of the catalyst can be analyzed in real time by rebuilding a DB using big data and constructing a prediction model, in a commercial plant that uses a fixed bed catalytic reaction.

As shown in FIG. 1, a system for selecting a process key factor affecting catalytic activity in a commercial chemical process according to the present disclosure includes a data extraction unit 10 that extracts tag data in units of minutes/hours by using plant process operation data in an olefin production process, laboratory data, a plant event master, and past yield data, an outlier discrimination unit 20 that discriminates and aggregates outliers by tag by using an outlier extraction reference master, an outlier processing unit 30 that generates an input mart draft excluding the outliers, a derived variable generation unit 40 that generates derived variables for each tag, and generates an advanced input mart having the derived variable added thereto, a yield calculation unit 50 that backs up the result of calculation of a yield by realizing a target value (yield) via exclusion and correction of the outliers, and a key factor extraction unit 60 that extracts a yield key factor by calculating importance of each tag, and backs up importance data for each tag (variable).

Here, data to be inputted into the data extraction unit 10 may be plant process operation data in an olefin production process, including data for each section, each unit, and each tag, laboratory data including LIMS (Laboratory Information Management System) data, plant event master data including a shut-down history, long integers/short integers, etc., and past yield data including conversion rates and selectivity.

The data to be inputted into the data extraction unit 10 is over 9,000 kinds of process tag (sensor) data in an olefin production process plant which is various kinds of temperature, pressure, flow, and composition data, for example, data accumulated continuously over the past five years from now in units of a set period.

Here, the units of a set period may be seconds or minutes, but not limited thereto.

Also, it is needless to say that the data accumulation period may be a period of time other than five years.

And, the outlier extraction reference master which is used for the outlier discrimination unit 20 to discriminate and aggregate outliers for each tag continuously updates reference values for extracting outliers over time in consistency with the concept of a machine learning-based system.

As an example, updates may be done daily, weekly, or monthly, but not limited thereto.

A method for selecting a key factor affecting catalytic activity in a commercial chemical process according to the present disclosure will be described below in concrete details.

Figure 2:
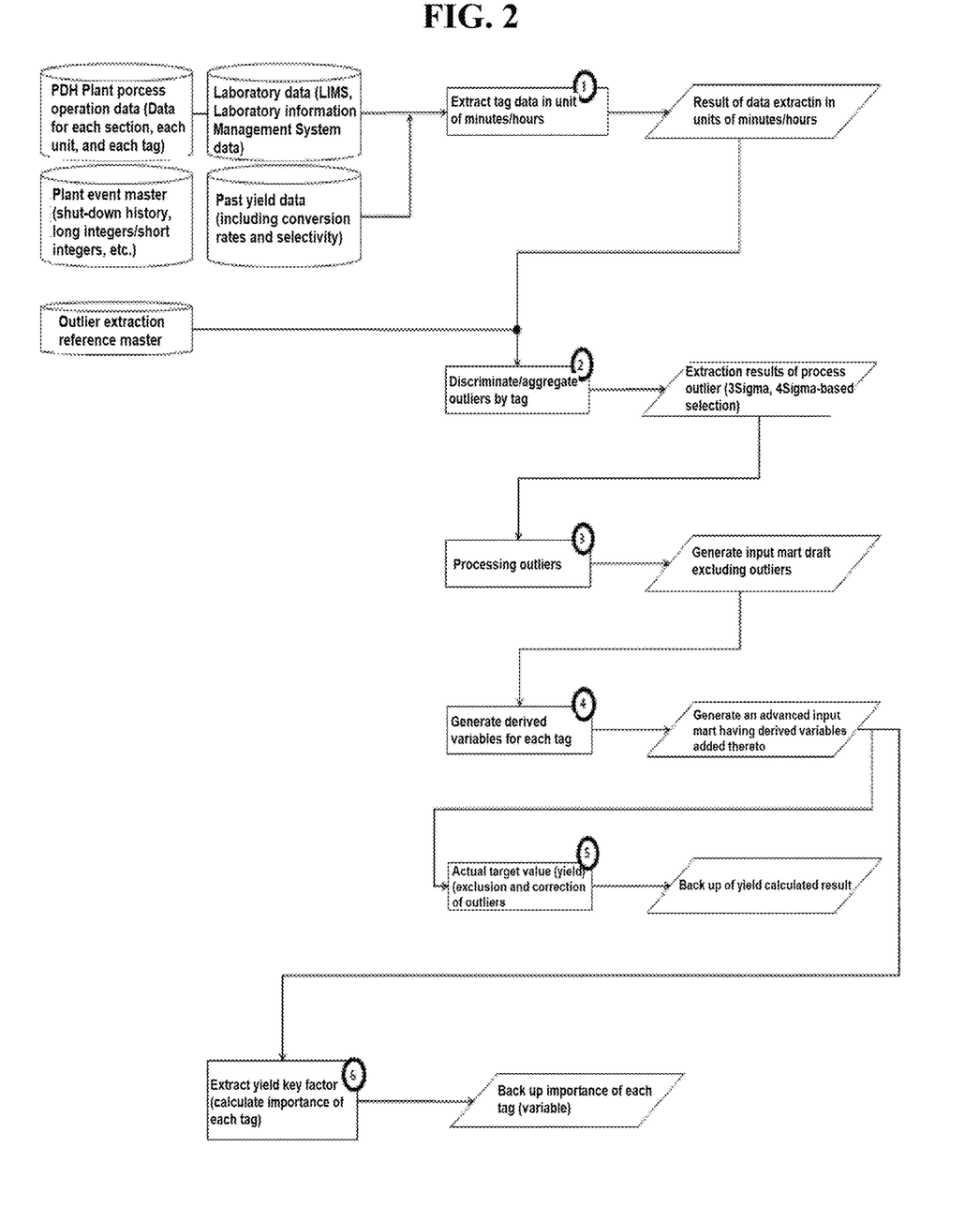
FIG. 2 is a flowchart of a method for selecting a process key factor in a commercial chemical process according to the present disclosure.

FIG. 2 is a flowchart of a method for selecting a process key factor in a commercial chemical process according to the present disclosure.

In the method for selecting a process key factor in a commercial chemical process according to the present disclosure, as shown in FIG. 2, ① a data extraction step is performed to extract tag data in units of minutes/hours by using plant process operation data in an olefin production process, laboratory data, a plant event master, and past yield data.

Subsequently, ② an outlier discrimination step is performed to discriminate and aggregate outliers by tag by using an outlier extraction reference master.

And, ③ an outlier processing step is performed to generate an input mart draft excluding the outliers.

Subsequently, ④ a derived variable generation step is performed to generate derived variables for each tag and generate an advanced input mart having the derived variable added thereto.

And, ⑤ a yield calculation step is performed to back up the result of calculation of a yield by realizing a target value (yield) via exclusion and correction of the outliers.

Subsequently, ⑥ a key factor extraction step is performed to extract a yield key factor by calculating importance of each tag and back up importance data for each tag (variable).

Here, in the data extraction step, over 9,000 kinds of sensor data (tag data) as SKA process data is accumulated every 30 seconds.

And, process, laboratory, and plant data is integrated/utilized for accurate yield prediction, and the data is converted in units of minutes or hours for analysis and stored in a data warehouse.

And, in the outlier discrimination step, outliers are selected and excluded or corrected, and then only filtered values are used as input, to which a technique of using a statically based sigma and a technique of filtering outliers using a quantile/quartile value may be applied.

And, in the outlier processing step, an input mart is an input data frame (similar to a table format) that is to be inputted to train a prediction model.

And, in the derived variable generation step, outliers are not used directly after being filtered from raw data, but derived variables are generated based on time differences and statistics to make data abundant (to avoid information loss).

For example, over 9,000 kinds of data is extended laterally to several tens of thousands of dimensions. That is, the diversity of columns/variables is greatly extended.

In this manner, once key factors affecting catalytic activity in a commercial chemical process is selected, the key factors may be reflected so as to be applied to a constructed forecasting model (ML/DL-based yield forecasting) to predict catalytic activity.

Figure 3A:
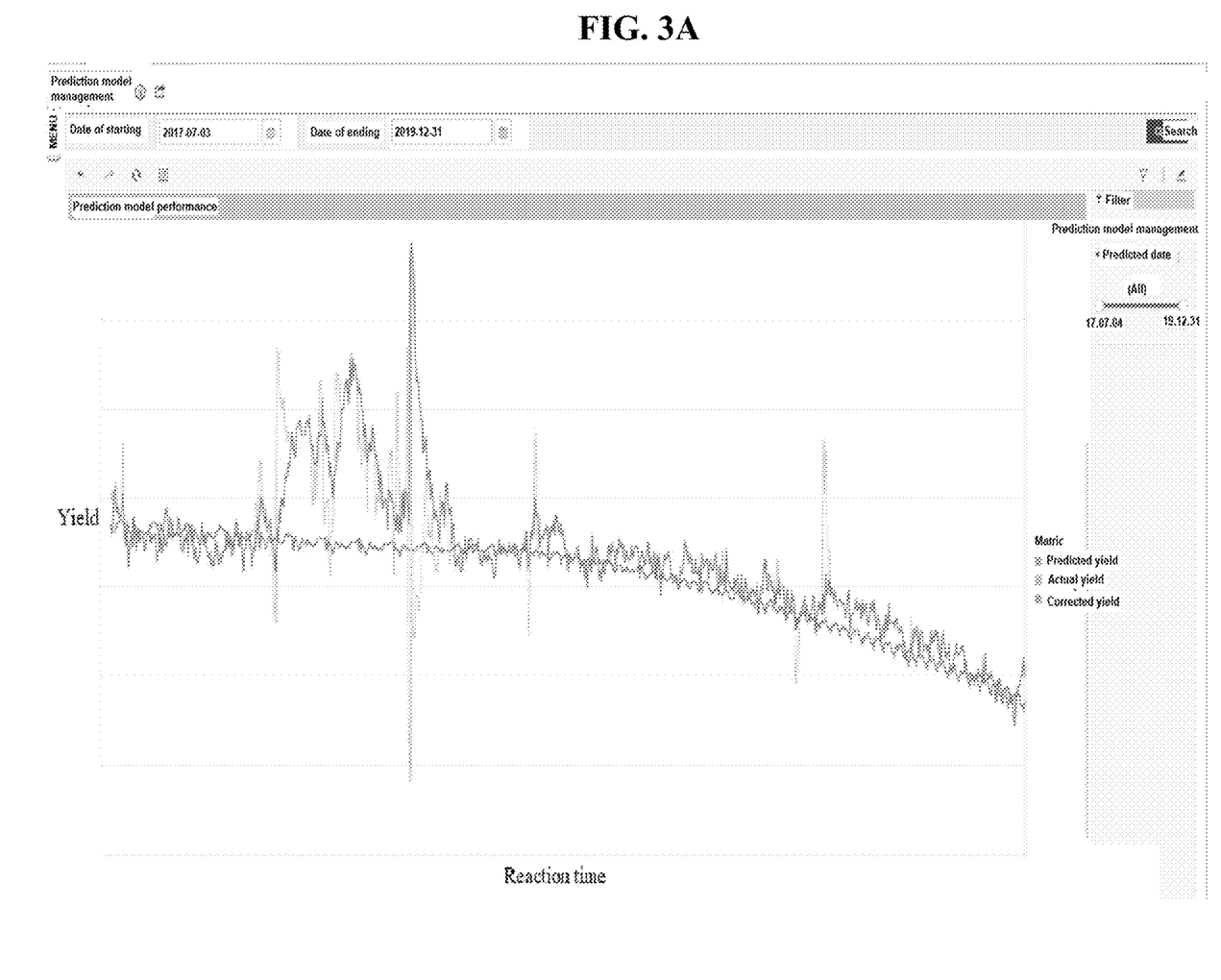

FIGS. 3A and 3B are output screen configuration diagrams showing an example of catalytic activity prediction results that reflect key factors in a commercial chemical process according to the present disclosure.

The above-described system and method for selecting a process key factor affecting catalytic activity in a commercial chemical process according to the present disclosure enable the optimization of an operation condition by efficiently selecting a key factor affecting a process change according to a process operation condition.

It will be understood by those skilled in the art to which the present disclosure belongs that the present disclosure may be implemented in modified forms without departing from the essential characteristics of the present disclosure.

Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

EXPLANATION OF REFERENCE NUMERALS

10: Data extraction unit
20: Outlier discrimination unit
30: Outlier processing unit
40: Derived variable generation unit
50: Yield calculation unit
60: Key factor extraction unit The present disclosure relates to process change monitoring, and more particularly, to a system and method for selecting a process key factor in a commercial chemical process, which enable the optimization of an operation condition by efficiently selecting a key factor affecting a process change according to a process operation condition.

The invention claimed is:

1. An apparatus for selecting a process key factor affecting catalytic activity in a commercial chemical process, the apparatus comprising:
    at least one sensor configured to obtain sensor data by measuring temperature, pressure, flow, and composition data in an olefin production process, including data for each section, each unit, and each tag;
    a data extraction unit configured to
        receive plant process operation data including the sensor data including the measured temperature, pressure, flow, and composition data, and
        extract, from the plant process operation data, tag data in units of a set period;
    an outlier discrimination unit configured to discriminate and aggregates outliers by tag by using an outlier extraction reference master;
    an outlier processing unit configured to generate an input mart draft excluding the outliers;
    a derived variable generation unit configured to generate derived variables for each tag, and generates an advanced input mart having the derived variable added thereto;
    a yield calculation unit configured to back up a result of calculation of a yield by realizing a target value via exclusion and correction of the outliers; and
    a key factor extraction unit configured to extract a yield key factor affecting catalytic activity in the commercial chemical process by calculating importance of each tag, and backs up importance data for each tag,
    wherein the outlier extraction reference master which is used for the outlier discrimination unit to discriminate and aggregate outliers for each tag continuously updates reference values for extracting outliers over time in consistency with a concept of a machine learning-based system, and
    wherein the data extraction unit, the outlier discrimination unit, the outlier processing unit, the derived variable generation unit, the yield calculation unit, and the key factor extraction unit are each implemented via at least one processor.

2. The apparatus of claim 1, wherein data to be inputted into the data extraction unit includes:
    the plant process operation data in the olefin production process, including the data for each section, each unit, and each tag;
    laboratory data including LIMS (Laboratory Information Management System) data, plant event master data including a shut-down history or long integers/short integers; and
    past yield data including conversion rates and selectivity.

3. A method for selecting a process key factor affecting catalytic activity in a commercial chemical process, the method comprising:
    a measuring step of obtaining sensor data by measuring, by at least one sensor, temperature, pressure, flow, and composition data in an olefin production process, including data for each section, each unit, and each tag;
    a receiving step of receiving plant process operation data including the sensor data including the measured temperature, pressure, flow, and composition data;
    a data extraction step of extracting, from the plant process operation data, tag data in units of a set period;
    an outlier discrimination step of discriminating and aggregating outliers by tag by using an outlier extraction reference master;
    an outlier processing step of generating an input mart draft excluding the outliers;
    a derived variable generation step of generating derived variables for each tag and generating an advanced input mart having the derived variable added thereto;

a yield calculation step of backing up a result of calculation of a yield by realizing a target value via exclusion and correction of the outliers; and a key factor extraction step of extracting a yield key factor affecting catalytic activity in the commercial chemical process by calculating importance of each tag, and backs up importance data for each tag, wherein the outlier extraction reference master which is used for the outlier discrimination step to discriminate and aggregate outliers for each tag continuously updates reference values for extracting outliers over time in consistency with a concept of a machine learning-based system.

4. The method of claim 3, wherein data used in the data extraction step includes:
the plant process operation data in the olefin production process, including the data for each section, each unit, and each tag;
laboratory data including LIMS (Laboratory Information Management System) data, plant event master data including a shut-down history or long integers/short integers; and
past yield data including conversion rates and selectivity.

5. The method of claim 4, wherein process, laboratory, and plant data is integrated/utilized for accurate yield prediction, and the data is converted to units of minutes or hours for analysis and stored in a data warehouse.

6. The method of claim 3, wherein, in the outlier discrimination step, a technique of using a statically based sigma and a technique of filtering outliers using a quantile/quartile value are applied in order to select and exclude or correct outliers and then use only filtered values as input.

7. The method of claim 3, wherein, in the outlier processing step, an input mart is an input data frame that is to be inputted to train a prediction model.

8. The method of claim 3, wherein, in the derived variable generation step, outliers are not used directly after being filtered from raw data, but derived variables are generated based on time differences and statistics to avoid information loss from data.

9. The method of claim 3, wherein the yield key factor extracted by calculating importance of each tag in the key factor extraction step is applied to a constructed forecasting model (ML/DL-based yield forecasting) and used to predict catalytic activity.

* * * * *